United States Patent [19]
De Witte et al.

[11] Patent Number: 5,900,441
[45] Date of Patent: * May 4, 1999

[54] PROCESS FOR PREPARING A FLEXIBLE POLYURETHANE FOAM

[75] Inventors: Mireille Berthine Albert De Witte, Ghent; Eric Huygens, Heverlee; Luc Van Essche, Kortenberg; Leo Franciscus Verstrepen, Zichem, all of Belgium

[73] Assignee: Imperial Chemical Industries PLC, London, United Kingdom

[*] Notice: This patent is subject to a terminal disclaimer.

[21] Appl. No.: 08/741,413

[22] Filed: Oct. 29, 1996

[30] Foreign Application Priority Data

Nov. 30, 1995 [EP] European Pat. Off. .............. 95118848

[51] Int. Cl.$^6$ .................................................. C08G 18/10
[52] U.S. Cl. .......................... 521/159; 521/160; 521/170; 528/67; 528/77; 560/26; 560/330
[58] Field of Search ..................................... 521/159, 160, 521/170; 528/67, 77; 560/26, 330

[56] References Cited

U.S. PATENT DOCUMENTS

| | | | |
|---|---|---|---|
| 4,478,960 | 10/1984 | Buethe et al. | 521/160 |
| 4,833,176 | 5/1989 | Wolf et al. | 521/160 |
| 4,945,117 | 7/1990 | Gansen et al. | 521/99 |
| 5,028,636 | 7/1991 | Gegauer et al. | 521/131 |
| 5,374,667 | 12/1994 | Hinz et al. | 521/159 |
| 5,439,948 | 8/1995 | De Vos et al. | 521/159 |
| 5,491,177 | 2/1996 | De Witte | 521/159 |
| 5,534,185 | 7/1996 | Hinz et al. | 252/182.22 |

FOREIGN PATENT DOCUMENTS

| | | |
|---|---|---|
| 2035252 | 8/1991 | Canada . |
| 0392788 | 10/1990 | European Pat. Off. . |

*Primary Examiner*—John M. Cooney, Jr.

[57] ABSTRACT

Process for preparing a flexible foam by reacting a polyisocyanate composition having an NCO value of 11–24% by weight with an isocyanate-reactive compound having a number average molecular weight of 1000–12000 using water as blowing agent.

9 Claims, No Drawings

PROCESS FOR PREPARING A FLEXIBLE POLYURETHANE FOAM

The present invention is concerned with a process for preparing flexible polyurethane foams and with a polyisocyanate composition for preparing such flexible foams.

It is widely known to prepare flexible polyurethane foams by reacting an organic polyisocyanate and a high molecular weight isocyanate-reactive compound in the presence of a blowing agent. More in particular it has been disclosed in EP-111121 to prepare flexible polyurethane foams from a polyisocyanate composition comprising a semi-prepolymer. The polyisocyanate composition is prepared by reacting a diphenylmethane diisocyanate and a polyol; a polymethylene polyphenylene polyisocyanate (polymeric MDI) is used as well. This polyisocyanate is either completely used in the preparation of the semi-prepolymer or added after the semi-prepolymer has been made. We have found that the use of polymeric MDI as proposed in EP-111121 does not provide satisfactory stability combined with low viscosity in particular for those polyisocyanate compositions having a relatively low NCO value, e.g. 11–22% by weight.

In EP-392788 flexible foams are prepared by reacting semi-prepolymers or prepolymers with an isocyanate-reactive composition containing a high amount of water.

In EP-296449 flexible foams are prepared by reacting polyisocyanates, polyols and water at a relatively low NCO-index.

Copending application PCT/EP95/02068 is concerned with a process for making flexible foams using a semi-prepolymer which has been made by reacting a portion of polymeric MDI with a polyol and adding the other part to the reaction product so obtained. Surprisingly it was found that when part of the polymethylene polyphenylene polyisocyanate (polymeric MDI) is used to prepare a semi-prepolymer and the other part of the polymeric MDI is added to the semi-prepolymer so formed the polyisocyanate compositions according to the present invention are stable, clear liquids having a low viscosity; consequently their processing in preparing the foams is improved as well. When the polymeric MDI is either completely used in the preparation of the semi-prepolymer or completely added after the semi-prepolymer has been made the stability and/or viscosity are adversely effected.

It has now been found that the polyisocyanate compositions may contain higher amounts of polymeric MDI while remaining stable and therefore flexible foams having a lower density can be prepared; the lower density does not significantly affect the other physical properties of the foam in a negative way.

Still further it has now been found that the addition of a relatively high amount of polymeric MDI to the semi-prepolymer further improves the resilience and foam stability and that the addition to the semi-prepolymer of such polymeric MDI together with toluene diisocyanate (TDI) leads to foams having a lower density and improved comfort properties like resilience and durability and better mechanical strenghts.

Accordingly the present invention is concerned with a process for preparing a flexible polyurethane foam by reacting
1) an organic polyisocyanate with
2) a polyol having an average nominal hydroxyl functionality of 2–3 and a number average molecular weight of 1000 to 12000; and optionally with
3) an isocyanate-reactive compound containing at least two isocyanate-reactive hydrogen atoms and having a number average molecular weight of 60 to 999; using
4) a blowing agent; and optionally
5) a catalyst; and optionally
6) other auxilairies and additives known per se, characterised in that
  a) the polyisocyanate is a polyisocyanate composition having an NCO value of 11–24, preferably of 13–22% by weight which is a blend of
    a1. 50–95 parts by weight of an isocyanate-terminated semi-prepolymer having an NCO value of 9–20 and preferably 11–18% by weight, prepared by reacting an excessive amount of a polyisocyanate composition, consisting of 35–75% by weight of diphenylmethane diisocyanate and 25–65% by weight of polymethylene polyphenylene polyisocyanate, with a polyol having an average nominal hydroxyl functionality of 2–3 and a number average molecular weight of 1000 to 12000; and
    a2. 26–50 parts by weight of a polymethylene polyphenylene polyisocyanate; or 2–25 and preferably 3–20 parts by weight of toluene diisocyanate and 2–48 and preferably 5–35 parts by weight of diphenylmethane diisocyanate and/or polymethylene polyphenylene polyisocyanate, the total amount of a1 and a2 being 100 parts by weight;
  b) 25–120 and preferably 35–100 parts by weight of polyol 2) is used per 100 parts by weight of organic polyisocyanate;
  c) water is used as blowing agent in an amount of 3–15, preferably 5–12 parts by weight per 100 parts by weight of polyol 2); and
  d) the reaction is conducted at an index of 40–130 and preferably above 70 to 100.

Further the present invention is concerned with a reaction system comprising the above mentioned ingredients with the proviso that the polyisocyanate is kept in a container separate from the isocyanate-reactive compounds.

Still further the present invention is concerned with the aforementioned polyisocyanate.

In the context of the present invention the following terms have the following meaning:
1) isocyanate index or NCO index or index:
  the ratio of NCO-groups over isocyanate-reactive hydrogen atoms present in a formulation, given as a percentage:

$$\frac{[NCO] \times 100}{[active\ hydrogen]} \quad (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce the semi-prepolymer or other modified polyisocyanates or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparation although in practice it will often be somewhat less because of some terminal unsaturation.

6) "MDI+TDI functionality" is the number average isocyanate functionality of all diphenylmethane diisocyanate, polymethylene polyphenylene polyisocyanate and toluene diisocyanate used in preparing the polyisocyanate composition according to the present invention with the proviso that the NCO groups used in the preparation of the semi-prepolymer are also taken into account in determining this functionality.

The diphenylmethane diisocyanate (MDI) used may be selected from pure 4,4'-MDI and isomeric mixtures of 4,4'-MDI and 2,4'-MDI and less than 10% by weight of 2,2'-MDI and modified variants thereof containing carbodiimide, uretonimine, isocyanurate, urethane, allophanate, urea or biuret groups. Most preferred are pure 4,4'-MDI, isomeric mixtures with 2,4'-MDI, and uretonimine and/or carbodiimide modified MDI having an NCO content of at least 25% by weight and urethane modified MDI obtained by reacting excess MDI and polyol (preferably having a molecular weight of at most 999) and having an NCO content of at least 25% by weight.

The polymethylene polyphenylene polyisocyanates used in the preparation of semi-prepolymer a1) and used as or in polyisocyanate a2) are known as such and are polyisocyanates comprising MDI and MDI homologues having isocyanate functionalities of 3 or more. These polyisocyanates are often referred to as "crude MDI" or "polymeric MDI" and are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the number average isocyanate functionality preferably ranges from 2.3–2.8. The NCO value of these polymeric MDIs is at least 30% by weight.

Such compositions contain from 30 to 65% by weight of diphenylmethane diisocyanate, the remainder being polymethylene polyphenylene polyisocyanates of functionality greater than two together with by-products formed in the manufacture of such polyisocyanates by phosgenation. These products, being liquids, are convenient to use according to the present invention. The polymethylene polyphenylene polyisocyanate used as or in polyisocyanate a 2) may be a mixture of polymeric or crude MDI as described above and MDI provided the polyisocyanates having an isocyanate functionality of greater than two constitute at least 10% by weight of the mixture.

The toluene diisocyanate used is known as such and may be selected from all isomers and mixtures thereof and in particular from 2,4- and 2,6-toluene diisocyanate and mixtures thereof.

The polyols having an average nominal hydroxyl functionality of 2–3 and a number average molecular weight of 1000 to 12000 (polyol 2) and the polyol used in preparing semi-prepolymer a1) may be selected from polyester polyols, polyesteramide polyols, polythioether polyols, polycarbonate polyols, polyacetal polyols, polyolefin polyols, polysiloxane polyols and especially polyether polyols.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, cyclohexane diamine, cyclohexane dimethanol, glycerol, trimethylolpropane and 1,2,6-hexanetriol. Mixtures of initiators and/or cyclic oxides may be used.

Especially useful polyether polyols include polyoxypropylene diols and triols and polyoxyethylene-polyoxypropylene diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 50%, based on the total weight of oxyalkylene units may be mentioned, in particular those having at least part of the oxyethylene groups at the end of the polymer chain. Mixtures of the said diols and triols can be particularly useful. Small amounts of polyoxyethylene diols and triols may be used as well; the amount in general is less than 20% by weight on the amount of polyol 2) used.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phtalic anhydride, tetrachlorophthalic anhydride or dimethyl terephathalate or mixtures thereof. Polyesters obtained by the polymerisation of lactones, for example caprolactaone, in conjunction with a polyol, or of hydroxy carboxylic acids such as hydroxy caproic acid, may also be used.

Polyesteramides may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetra-ethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Other polyols which may be used as polyol 2) and/or in preparing semi-prepolymer a1) comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in polymeric polyols, for example polyether polyols, or by the in situ reaction between a polyisocyanate and an amino- and/or hydroxy-functional compound, such as triethanolamine, in a polymeric polyol. Polyoxyalkylene polyols containing from 5 to 50% by weight of dispersed polymer are particularly useful. Particle sizes of the dispersed polymers of less than 50 microns are preferred.

The number average molecular weight of polyols 2) and the polyols used in preparing semi-prepolymer a1) preferably is 1000–8000 and most preferably 1500–7000; the hydroxyl value preferably ranges from 15–200 and most preferably from 20–100.

Most preferred are polyoxyethylene polyoxypropylene polyols having a number average molecular weight of 2000–7000, an average nominal functionality of 2–3 and an oxyethylene content of 10–25% by weight, preferably having the oxyethylene groups at the end of the polymer chain.

During the last years several methods have been described to prepare polyether polyols having a low level of unsaturation. These developments have made it possible to use polyether polyols at the higher end of the molecular weight range since much polyols can now be prepared with an acceptably low level of unsaturation. According to the present invention polyols having a low level of unsaturation may be used as well. In particular such high molecular weight polyols having a low level of unsaturation may be used for preparing flexible foams having a high ball rebound.

The isocyanate-terminated semi-prepolymer a1. is prepared by first mixing the diphenylmethane diisocyanate and the polymethylene polyphenylene polyisocyanate. Subsequently the polyol is added and the mixture is allowed to react. Such reaction is allowed to take place at 60–100° C. and in general the use of catalyst is not necessary. The relative amount of polyisocyanate and polyol depends on the desired NCO-value of the semi-prepolymer, the NCO-value of the polyisocyanate used and the OH value of the polyol and can be easily calculated by those skilled in the art. After completion of the above reaction polyisocyanate a2 is added in any order and mixed. The "MDI+TDI-functionality" of the polyisocyanate composition according to the present invention is 2.05–2.35 and preferably 2.05–2.30.

The chain-extending and cross-linking agents which optionally may be used (isocyanate-reactive compound 3)) may be selected from amines and polyols containing 2–8 and preferably 2–4 amine and/or hydroxy groups like ethanolamine, diethanolamine, triethanolamine, ethylene glycol, diethylene glycol, triethylene glycol, propylene glycol, dipropylene glycol, butanediol, glycerol, trimethylolpropane, pentaerithritol, sorbitol, sucrose, polyethylene glycol having a molecular weight of at most 999, toluene diamine, diethyl toluene diamine, cyclohexane diamine, phenyl diamine, diphenylmethane diamine, alkylated diphenylmethane diamine and ethylene diamine.

The amount of chain-extending and cross-linking agents is, if applied, up to 25 and preferably up to 10 parts by weight per 100 parts by weight of polyol 2).

The auxiliaries and additives which amongst others may be used are formation of urea and urethane enhancing catalysts like tertiary amines and tin compounds, surfactants, stabilisers, flame retardants, fillers and anti-oxidants.

The flexible polyurethane foams are prepared by combining and mixing ingredients 1)–6) and allowing the mixture to foam. Preferably ingredients 2)–6) are premixed and subsequently combined with the polyisocyanate. The relative amounts of polyisocyanate on the one hand and ingredients 2)–6) on the other hand depend on the desired index and can be calculated easily by those skilled in the art.

The process may be used to make slab-stock or moulded flexible foams. The foams in general have a density of 15–80 kg/m$^3$ and may be used as cushioning material in furniture, car seats and mattresses.

The present invention is illustrated by the following Examples.

EXAMPLE 1

A semi-prepolymer was prepared by 1) mixing 9.1 parts by weight of a diphenylmethane diisocyanate containing 85% by weight of 4,4'-diphenylmethane diisocyanate and 15% by weight of 2,4'-diphenylmethane diisocyanate and 5.5 parts by weight of a polymethylene polyphenylene polyisocyanate having an NCO value of 30.7% by weight, a number average isocyanate functionality of 2.7, and about 38% w of diisocyanates 2) adding to this mixture 19.2 parts by weight of a polyoxyethylene polyoxypropylene polyol having a nominal functionality of 3, a number average molecular weight of 6000 and an oxyethylene content of 15% by weight (all tip) followed by mixing, and 3) allowing this mixture to react at 85° C. for 4 hours.

To the semi-prepolymer so obtained which had an NCO value of 12.9% by weight was added 11.6 parts by weight of a diphenylmethane diisocyanate containing 80% by weight of 4,4'-diphenylmethane diisocyanate and 20% by weight of 2,4'-diphenylmethane diisocyanate and 6.6 parts by weight of the above polymethylene polyphenylene polyisocyanate and mixed.

The composition obtained was an isocyanate composition according to the present invention; had an NCO value of 19.8% by weight and a viscosity of 950 mPa.s at 25° C.; the composition was clear and stable for more than 2 weeks at 0° C. and room temperature (stability was determined visually; when solids and turbidity were visually absent the composition was regarded as stable) and had an "MDI+TDI functionality" of 2.20.

A flexible foam was prepared in a mould by pouring in said mould a mixture comprising 52 parts of the above isocyanate composition according to the invention and 48.1 parts by weight of an isocyanate-reactive composition (index 74) comprising 38.5 parts by weight (pbw) of a polyol having a nominal functionality of 3, a number average molecular weight of 4800 and an oxyethylene content of 15% by weight (all tip), 2.5 pbw of water, 6 pbw of a polyoxyethylene polyol having a nominal functionality of 2 and a number average molecular weight of 600, 0.1 pbw of D 33 LV (catalyst from Air Products), 0.05 pbw of dimethylaminopropylamine, 0.3 pbw of triethanolamine, 0.3 pbw of DC 5043 (surfactant from DOW Corning) and 0.35 pbw of dimethylethanolamine. The mixture was allowed to react and to foam. The foam obtained was a flexible foam having a free rise density of 32 kg/m$^3$ (ISO 845); a resilience of 58% (JIS B1501), compression set dry/humid at 50% of 7/8 (ISO 1856), indentation hardness (25%) of 120N (ISO 2439), an elongation of 106% (ISO 1798) and a core density of 38 kg/m$^3$ (ISO 845).

EXAMPLE 2

The above experiment was repeated with the same ingredients with the proviso that 2.5 pbw of TDI was added to the polyisocyanate composition made in example 1 and that the index was 74.

A flexible foam was obtained having a free rise density of 30 kg/m$^3$ (ISO 845), a resilience of 60% (JIS B1501), compression set dry/humid at 50% of 7/9 (ISO 1856), indentation hardness 25% of 90N (ISO 2439), an elongation of 120% (ISO 1798) and a core density of 38 kg/m$^3$ (ISO 845).

We claim:

1. A process for preparing a flexible polyurethane foam by reacting
   1) an organic polyisocyanate; with
   2) a polyol having an average nominal hydroxyl functionality of 2–3 and a number average molecular weight of 1000 to 12000; and optionally with
   3) an isocyanate-reactive compound containing at least two isocyanate-reactive hydrogen atoms and having a number average molecular weight of 60 to 999; using
   4) a blowing agent; and optionally
   5) a catalyst; and optionally
   6) other auxiliaries and additives characterised in that
      a) the polyisocyanate is a polyisocyanate composition having an NCO value of 11–24% by weight which is a blend of
         a1. 50–95 parts by weight of an isocyanate-terminated semi-prepolymer having an NCO value of 9–20% by weight, prepared by reacting an excessive amount of a polyisocyanate composition, consisting of 35–75% by weight of diphenylmethane diisocyanate and 25–65% by weight of polymethylene polyphenylene polyisocyanate, with a polyol having an average nominal hydroxyl functionality of 2–3 and a number average molecular weight of 1000 to 12000; and
         a2. 26–50 parts by weight of a polymethylene polyphenylene polyisocyanate; or 2–25 parts by weight of toluene diisocyanate and 2–48 by weight of diphenylmethane diisocyanate and/or polymethylene polyphenylene polyisocyanate, the total amount of a1 and a2 being 100 parts by weight;
      b) 25–120 parts by weight of polyol 2) is used per 100 parts by weight of organic polyisocyanate;
      c) water is used as blowing agent in an amount of 3–15 parts by weight per 100 parts by weight of polyol 2); and
      d) the reaction is conducted at an index of 40–130.

2. Process according to claim 1, wherein the organic polyisocyanate has an MDI+TDI functionality of 2.05–2.35.

3. Process according to claim 1, wherein the organic polyisocyanate has an NCO value of 13–22% by weight, the semi-prepolymer has an NCO value of 11–18% by weight, the amount of polyol 2) is 35–100 parts by weight per 100 parts by weight of organic polyisocyanate, the amount of water is 5–12 parts by weight per 100 parts by weight of polyol 2), the index is above 70 to 100 and the organic polyisocyanate has an MDI+TDI functionality of 2.05–2.30.

4. Reaction system comprising
   1) an organic polyisocyanate;
   2) a polyol having an average nominal hydroxyl functionality of 2–3 and a number average molecular weight of 1000 to 12000; and optionally
   3) an isocyanate-reactive compound containing at least two isocyanate-reactive hydrogen atoms and having a number average molecular weight of 60 to 999;
   4) a blowing agent; and optionally
   5) a catalyst; and optionally
   6) other auxiliaries and additives characterised in that
      a) the polyisocyanate is a polyisocyanate composition having an NCO value of 11–24% by weight which is a blend of
         a1. 50–95 parts by weight of an isocyanate-terminated semi-prepolymer having an NCO value of 9–20% by weight, prepared by reacting an excessive amount of a polyisocyanate composition, consisting of 35–75% by weight of diphenylmethane diisocyanate and 25–65% by weight of polymethylene polyphenylene polyisocyanate, with a polyol having an average nominal hydroxyl functionality of 2–3 and a number average molecular weight of 1000 to 12000; and
         a2. 26–50 parts by weight of a polymethylene polyphenylene polyisocyanate; or 2–25 parts by weight of toluene diisocyanate and 2–48 parts by weight of diphenylmethane diisocyanate and/or polymethylene polyphenylene polyisocyanate, the total amount of a1 and a2 being 100 parts by weight;
      b) 25–120 parts by weight of polyol 2) is used per 100 parts by weight of organic polyisocyanate;
      c) water is used as blowing agent in an amount of 3–15 parts by weight per 100 parts by weight of polyol 2); and
      d) the relative amount of polyisocyanate 1) with respect to the other ingredients is such that when combined the index is 40–130; with the proviso that the polyisocyanate is kept in a container separate from the isocyanate-reactive compounds.

5. Reaction system according to claim 4 wherein the organic polyisocyanate has an MDI+TDI functionality of 2.05–2.35.

6. Reaction system according to claim 4 wherein the organic polyisocyanate has an NCO value of 13–22% by weight, the semi-prepolymer has an NCO value of 11–18% by weight, the amount of polyol 2) is 35–100 parts by weight per 100 parts by weight of organic polyisocyanate, the amount of water is 5–12 parts by weight per 100 parts by weight of polyol 2), the index is above 70 to 100 and the organic polyisocyanate has an MDI+TDI functionality of 2.05–2.30.

7. Organic polyisocyanate composition, characterised in that the composition has an NCO value of 11–24% by weight and is a blend of a1. 50–95 parts by weight of an isocyanate-terminated semi-prepolymer having an NCO value of 9–20% by weight, prepared by reacting an excessive amount of a polyisocyanate composition, consisting of 35–75% by weight of diphenylmethane diisocyanate and 25–65% by weight of polymethylene polyphenylene polyisocyanate, with a polyol having an average nominal hydroxyl functionality of 2–3 and a number average molecular weight of 1000 to 12000; and a2. 26–50 parts by weight of a polymethylene polyphenylene polyisocyanate; or 2–25 parts by weight of toluene diisocyanate and 2–48 parts by weight of diphenylmethane diisocyanate and/or polymethylene polyphenylene polyisocyanate, the total amount of a1 and a2 being 100 parts by weight.

8. Composition according to claim 7 wherein the MDI+TDI functionality of the composition is 2.05–2.35.

9. Composition according to claim 7 wherein the composition has an NCO value of 13–22% by weight, the semi-prepolymer has an NCO value of 11–18% by weight and the composition has an MDI+TDI functionality of 2.05–2.30.

* * * * *